US012559907B2

(12) United States Patent
Muthu et al.

(10) Patent No.: US 12,559,907 B2
(45) Date of Patent: Feb. 24, 2026

(54) OPERATOR CONFIRMATION OF MACHINE CONTROL SCHEME

(71) Applicant: Caterpillar Inc., Peoria, IL (US)

(72) Inventors: Rajasurendiran Muthu, Salem (IN);
Minhal Rashid Rashid, Spalding (GB);
Sirui Li, Kobe (JP); Shelby Elaine Spivey, Raleigh, NC (US)

(73) Assignee: Caterpillar Inc., Peoria, IL (US)

( * ) Notice: Subject to any disclaimer, the term of this patent is extended or adjusted under 35 U.S.C. 154(b) by 197 days.

(21) Appl. No.: 18/374,590

(22) Filed: Sep. 28, 2023

(65) Prior Publication Data

US 2025/0109570 A1 Apr. 3, 2025

(51) Int. Cl.
*E02F 9/20* (2006.01)
*B60K 35/10* (2024.01)

(52) U.S. Cl.
CPC ........... *E02F 9/2012* (2013.01); *B60K 35/10* (2024.01)

(58) Field of Classification Search
None
See application file for complete search history.

(56) References Cited

U.S. PATENT DOCUMENTS

| | | | |
|---|---|---|---|
| 6,542,789 B2 | 4/2003 | Ufheil | |
| 9,150,147 B2 | 10/2015 | Brush et al. | |
| 9,718,360 B2 | 8/2017 | Yang | |
| 11,236,492 B1 | 2/2022 | Ready-Campbell et al. | |
| 11,505,919 B2 | 11/2022 | Kandula et al. | |
| 2019/0390441 A1 | 12/2019 | Storey | |
| 2020/0181880 A1* | 6/2020 | Meyer | G05G 9/047 |
| 2023/0183942 A1* | 6/2023 | Tamura | E02F 9/26 |
| | | | 715/771 |

FOREIGN PATENT DOCUMENTS

| | | | | | |
|---|---|---|---|---|---|
| WO | WO-2011041884 A1 * | 4/2011 | | | B66C 13/40 |
| WO | WO-2021149775 A1 * | 7/2021 | | | E02F 9/262 |

OTHER PUBLICATIONS

Cat Products, "Excavator Joystick Controls", uploaded Feb. 22, 2022, available at <<https://www.youtube.com/watch?v=DHhgLFQYyjU>>, 6 pages.
Written Opinion and International Search Report for Int'l. Patent Appln. No. PCT/US2024/041600, mailed Dec. 5, 2024 (11 pgs).

* cited by examiner

*Primary Examiner* — Hitesh Patel
*Assistant Examiner* — Elle Rose Knudson

(57) ABSTRACT

A customizable control scheme determines operations of a machine or attached implements that result from usage of machine controls by an operator. A display of the machine presents a control scheme confirmation screen in response to the machine turning on, a new implement being attached to the machine, or another trigger condition. An operator can learn the control scheme that the machine is currently configured to use via the control scheme confirmation screen, and provide user input confirming that the operator is aware of the control scheme that the machine is currently configured to use prior to beginning active operations of the machine following the trigger condition.

20 Claims, 5 Drawing Sheets

400

OPERATOR CONFIRMATION OF MACHINE CONTROL SCHEME

TECHNICAL FIELD

The present disclosure relates to user-customizable control schemes for machines and, more particularly, to a user interface confirmation screen displayed to confirm that an operator of a machine is aware of the control scheme that the machine is configured to use prior to operation of the machine.

BACKGROUND

A machine, such as a track-type loader, excavator, or other commercial or work machine, can be used to perform work operations at a worksite or other location. A human operator can use machine controls of the machine, such as joysticks, levers, buttons, and other types of control devices, to control operations of the machine.

Some machines allow human operators to change control schemes such that the same physical machine controls can be adjusted or remapped to cause the performance of different machine operations. However, when an operator is about to begin operating a machine, it may not be apparent to the operator what control scheme the machine is currently configured to use.

For example, when a new operator begins operating the machine, the new operator may not initially be aware that a previous operator changed the control scheme associated with the machine. For instance, the new operator may expect to operate the machine based on a default control scheme, and be surprised when usage of the machine controls does not result in operations that were expected by the new operator. The new operator may have to learn what the current control scheme is based on experimentation and trial and error, for instance by using machine controls over a period of time to determine which machine operations result from the usage of the machine controls. It can take time for the operator to learn the current control scheme through trial and error, which may be dangerous and/or lead to decreased productivity on a worksite.

Moreover, it can be dangerous and/or inefficient for an operator to begin operating a machine without knowing that the machine is using a different control scheme than the operator expects. For instance, if the operator expects that a particular button will cause a bucket attached to the machine to rise, but that button is actually set to dump a load within the bucket, the operator may be surprised when the operator presses that button and material in the bucket is dumped instead of moved upwards. Moreover, such an unexpected dump of material may be dangerous to nearby people and objects, and/or damage material that the operator had intended to move to a different location.

Various systems have been developed to display information to operators of vehicles and other machines. For example, U.S. Pat. No. 9,718,360 to Yang (hereinafter "Yang") describes a display device for a vehicle that can present information to occupants of the vehicle, such as a driver and/or passengers. The display device described by Yang can be divided into a main display region and an auxiliary display region that may present information associated with different applications. The display device described by Yang can also be a touch screen or have other input functions, such that user commands can be received via the display device.

However, display systems such as the display device described by Yang are generally focused on displaying information and receiving user input while a vehicle or other machine is in active use. Accordingly, such display systems may have limited abilities to display information before an operator begins to operate a machine.

Examples of the present disclosure are directed to overcoming the deficiencies noted above.

SUMMARY

According to a first aspect, a computer-implemented method includes causing, by a processor of an on-board computing system of a machine, a display of the machine to present a control scheme confirmation screen. The control scheme confirmation screen visually depicts a control scheme that, based on control scheme data, is currently configured to be used to translate input data from machine controls of the machine into corresponding operations of the machine. The computer-implemented method also includes receiving, by the processor, and via the control scheme confirmation screen, user input comprising a confirmation of the control scheme. The computer-implemented method additionally includes enabling, by the processors, and based on the user confirmation input, active machine operations of the machine that are controlled via the machine controls based on the control scheme data.

According to a second aspect, a machine includes a transmission, an implement configured to perform at least one work task, machine controls, a display, and an on-board computing system. The one or more machine controls are configured to, based on a control scheme defined by control scheme data, control operations of at least one of the transmission or the implement. The on-board computing system is configured to cause the display to present a control scheme confirmation screen that visually depicts the control scheme. The on-board computing system is also configured to receive, via the control scheme confirmation screen, user input comprising a confirmation of the control scheme. The on-board computing system is additionally configured to enable, based on the user input, active machine operations of the at least one of the transmission or the implement that are controlled via the machine controls based on the control scheme data.

According to a third aspect, a computing system on-board a machine includes a processor and a memory having stored thereon computer-executable instructions. The computer-executable instructions, when executed by the processor, cause the processor to cause a display of the machine to present a control scheme confirmation screen. The control scheme confirmation screen visually depicts a control scheme that, based on control scheme data, is currently configured to be used to translate input data from machine controls of the machine into corresponding operations of the machine. The computer-executable instructions, when executed by the processor, also cause the processor to receive, via the control scheme confirmation screen, user input comprising a confirmation of the control scheme. The computer-executable instructions, when executed by the processor, additionally cause the processor to enable, based on the user input, active machine operations of the machine that are controlled via the machine controls based on the control scheme data.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
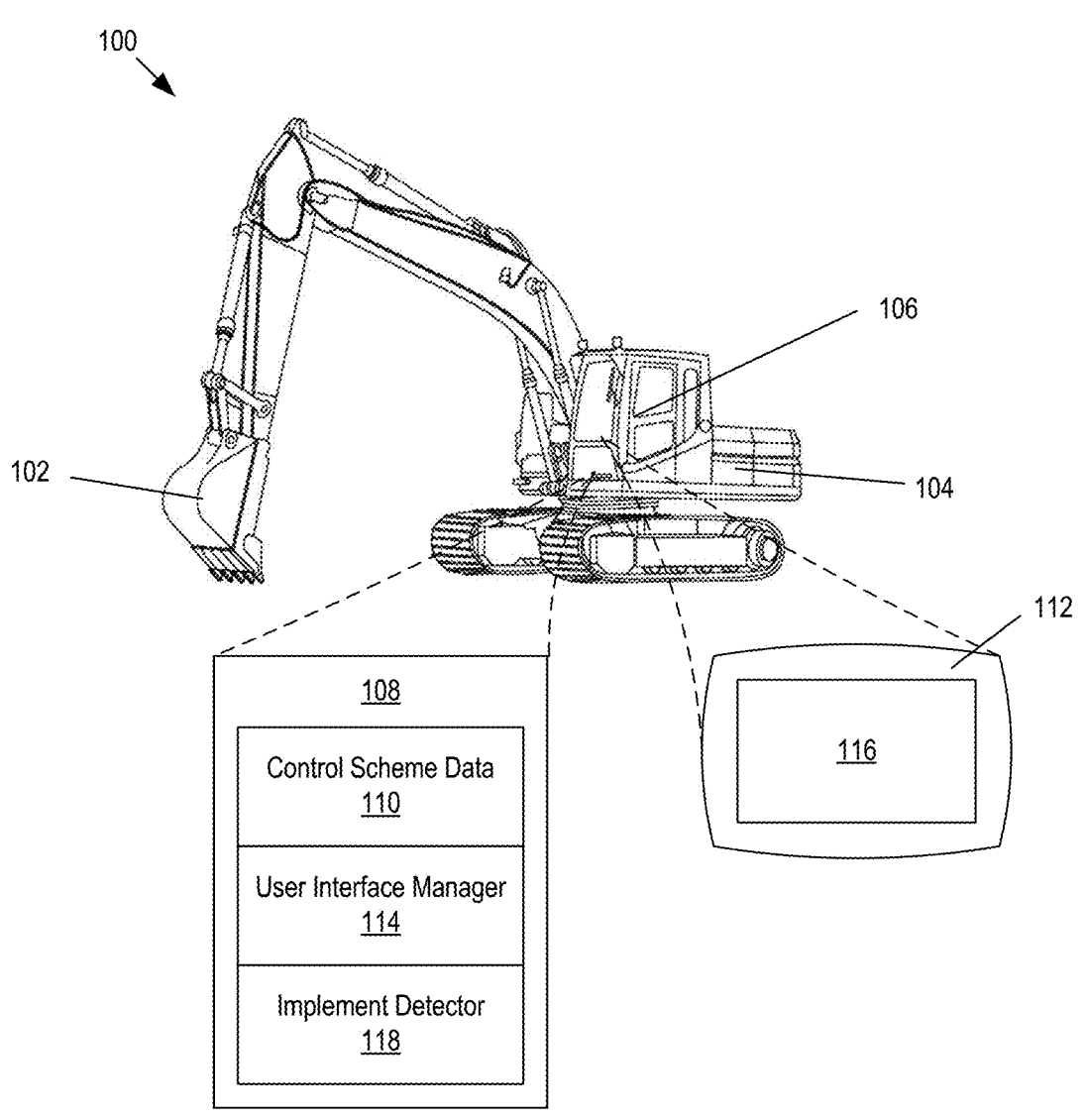
FIG. 1 is an exemplary diagrammatic illustration of a machine that has a customizable control scheme.

FIG. 1 is an exemplary diagrammatic illustration of a machine 100 that has a customizable control scheme. The machine 100 can be a vehicle, a piece of heavy machinery, a piece of industrial equipment, or any other type of machine. For example, the machine 100 can be a commercial or work machine, such as a mining vehicle, earthmoving vehicle, backhoe, excavator, scraper, dozer, crusher, loader (e.g., large wheel loader, track-type loader, etc.), shovel, truck (e.g., mining truck, haul truck, on-highway truck, off-highway truck, articulated truck, tanker, etc.), a crane, a pipe layer, a paver, a compactor, a tractor, farming equipment, or any other type of mobile machine, stationary machine, or portable machine.

In some examples, the machine 100 may operate at, and/or travel around, a worksite, such as a mine site, a quarry, a construction site, a farm, or any other type of worksite or work environment. The machine 100 can have one or more implements 102, such as a bucket, scraper, ripper, blade, pusher, fork, grapple, plow, haul bed, or other type of work tool or implement that the machine 100 may use to perform work operations. For example, the machine 100 may use one or more types of implements 102 to move and/or otherwise interact with rocks, gravel, dirt, sand, lumber, construction material, and/or any other type of material on a worksite.

As discussed further below, one or more types of implements 102 may be removable and/or detectable from the machine 100. Accordingly, different implements 102 may be attached to the machine 100 at different times, such that the machine 100 may use different implements 102 to perform different types of work operations.

One or more engines, motors, transmissions, drivetrains, hydraulic systems, and/or other elements of the machine 100 can power propulsion of the machine 100 and/or movement of the implements 102. For example, a transmission 104 of the machine 100 can cause movement of wheels, treads, and/or other elements of the machine 100 and thereby cause the machine 100 to drive around a worksite or other environment.

The machine 100 has one or more types of machine controls 106 that can be used by a human operator of the machine 100. In various examples, the machine controls 106 can include joysticks, levers, pedals, steering wheels, buttons, keypads, switches, dials, knobs, triggers, touch-sensitive display screens, other touch-sensitive input elements, and/or other types of input elements.

A human operator can use the machine controls 106 to control operations of the machine 100, such as driving operations of the machine 100, operations of one or more implements 102, operations of lights and other auxiliary systems of the machine 100, and/or other operations associated with the machine 100. As an example, the machine 100 may be a staffed machine that is operated by a human operator who interacts with one or more machine controls 106 to control a driving speed and driving direction of the machine 100, and/or to control movement of one or more implements 102 of the machine 100 during work operations. As another example, the machine 100 may be a semi-autonomous machine that may have some functions that are controlled automatically by an on-board computing system and/or a remote computing system, but that has at least some functions that can be controlled by a human operator via one or more types of machine controls 106. The machine controls 106 can be located in a cab of the machine 100, or at another location on or within the machine 100, such that the machine controls 106 are accessible and usable by a human operator while the machine 100 is in operation.

In some examples, multiple types of machine controls 106 can be combined into a single input device. For example, the machine 100 may have a joystick that can be physically moved by an operator to control a movement direction of the machine 100 or an implement. However, the joystick may also have one or more integrated buttons, dials, triggers, or other input elements that the operator can use to control or adjust other types of operations of the machine 100 or the implement. For instance, the joystick may have one button that can cause a horn of the machine 100 to sound, and also have other buttons or input elements that can cause the transmission 104 of the machine 100 to upshift and downshift.

The machine 100 may also have multiple machine controls 106 that together control the same operations, or that separately control different operations or different elements of the machine 100. As a first example, the machine controls 106 may include a joystick and a foot pedal, such that an operator may control movement directions of the machine 100 via the joystick and also control movement speed of the machine 100 via the foot pedal. As a second example, the machine controls 106 may include a joystick and a lever, such that an operator may control driving movements of the machine 100 via the joystick and separately and/or simultaneously control movements of an implement attached to the machine 100 via the lever.

Different types and/or models of machines may have different machine controls 106. As an example, one track-type loader model may have a joystick with three buttons, while another track-type loader model may have a joystick with two buttons or have a lever instead of a joystick. As another example, the transmission 104 of one machine model may be controlled via a joystick and one brake pedal, while the transmission 104 of a different machine model may be controlled via a shift lever, a left steering pedal, a right steering pedal, and a brake pedal.

The machine controls 106 can receive and/or capture input data based on how an operator of the machine 100 interacts with the machine controls 106. The machine controls 106 can also provide the input data to a controller 108 of the machine 100. The controller 108 can be an on-board computing system of the machine 100, such as an electronic control module (ECM) or other computing system that is on-board the machine 100. The controller 108 can use control scheme data 110 to translate input data, received via the machine controls 106, into commands and/or signals that cause corresponding operations of the machine 100 and/or one or more implements 102 of the machine 100. For example, the controller 108 can translate input data received via one or more machine controls 106 into data commands, electrical signals, hydraulic valve movements, and/or other operations or instructions that cause corresponding movements or operations of the machine 100 overall and/or one or more implements 102 of the machine 100. Accordingly, the control scheme data 110 can define a current control scheme that is currently configured to be used to control operations of the machine 100 and/or one or more implements 102.

As described herein, the control scheme data 110 can be user-configurable. Accordingly, although the machine controls 106 of the machine 100 can physically remain the same, operators can reconfigure the control scheme data 110 such that the same input provided by operators via the machine controls 106 is translated by the controller 108 differently to thereby cause different operations of the machine 100 and/or the implements 102. As a non-limiting example, an operator may configure the control scheme data 110 such that a forward movement of a lever causes an upward movement of an implement attached to the machine 100. However, at a different time, the same operator or a different operator may reconfigure the control scheme data 110 such that the same forward movement of the same lever instead causes downward movement of the implement attached to the machine 100. An example of reconfiguring control scheme data 110 to change operations that result from the same operator inputs provided via machine controls 106 is discussed further below with respect to FIG. 2.

The machine 100 can have a display 112, such as a screen, that is configured to present information to operators of the machine 100. For example, the display 112 can present information via a graphical user interface (GUI) or other user interface presented via the display 112. In some examples, the display 112 can be a screen that is integrated into a dashboard in a cab of the machine 100. In other examples, the display can be a separate display device or screen that can be mounted to the machine 100 or otherwise be present on or within the machine 100. In some examples, the display 112 can be a touch-sensitive screen that can accept touch-based user input from an operator. In other examples, other buttons, keypads, or user input devices associated with the display 112 can be used to receive user input from the operator in association with information displayed via the display 112. For example, an operator may use separate buttons to select and/or otherwise interact with user interface elements or other data presented via the display 112.

A user interface manager 114 of the machine 100 can be configured to determine which user interface elements and other information is presented via the display 112. The user interface manager 114 can also be configured to receive and/or process user input provided via the display 112 and/or in association with the display 112, such as user commands provided by an operator in response to information presented on the display 112. The user interface manager 114 can be executed by the controller 108 or another on-board computing system of the machine 100.

Figure 3:
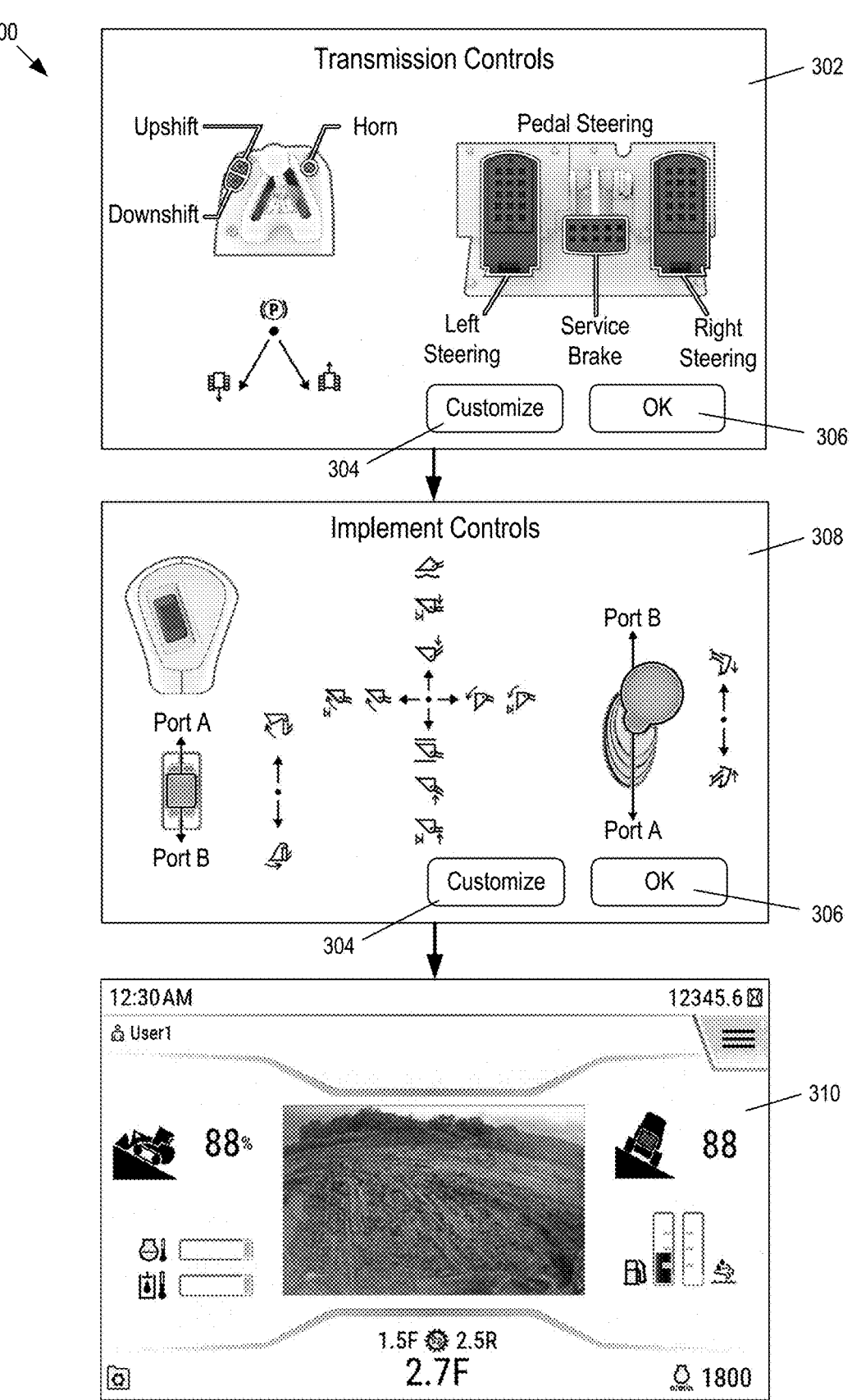
FIG. 3 shows an example of a sequence of control scheme confirmation screens that may be presented via a display.

As described herein, the user interface manager 114 can cause at least one control scheme confirmation screen 116 to be presented via the display 112. The control scheme confirmation screen 116 can present information associated with the current control scheme that the machine 100 is configured to use, based on the control scheme data 110 that the controller 108 is currently configured to use to translate input received via the machine controls 106 into corresponding operations of the machine 100 and/or implements 102. For example, the control scheme confirmation screen 116 can display, based on the current control scheme indicated by the control scheme data 110, visual representations of the machine controls 106 and corresponding operations that would currently result from usage of the machine controls 106 by an operator. Example instances of the control scheme confirmation screen 116 are shown in FIG. 3, and are discussed further below.

Accordingly, the operator can review the control scheme confirmation screen 116 to learn the current control scheme that the machine 100 is currently configured to use. For instance, if the current control scheme is not a default control scheme or other control scheme that an operator may expect, the operator may learn the current control scheme via the control scheme confirmation screen 116. The operator can correspondingly adjust how the operator uses the machine controls 106 to control operations of the machine 100 and/or implements 102. For instance, rather than assuming which machine controls 106 will cause certain operations, the operator can use the control scheme confirmation screen 116 to learn which specific machine controls 106 are currently set to cause those operations.

In some examples, the control scheme confirmation screen 116 may also provide options for the operator to adjust the control scheme, for instance via menus, other screens, and/or user-selectable options that allow the operator to provide user input to remap the machine controls 106 to perform different operations. The control scheme data 110 stored and/or used by the controller 108 can be changed based on requested changes indicated by the user input, such that the controller 108 can use the changed control scheme data 110 to translate input received via the machine controls 106 into new or different operations of the machine 100 and/or implements 102.

The control scheme confirmation screen 116 can also be configured to accept user confirmation input from an operator that confirms that the operator is aware of the current control scheme. The current control scheme may be the control scheme that the machine 100 was previously configured to use if the operator has not made any changes to the control scheme via the control scheme confirmation screen 116, or a new current control scheme that the operator has selected or adjusted via the control scheme confirmation screen 116. Once the operator uses the control scheme confirmation screen 116 to confirm that the operator is aware of the current control scheme, the user interface manager 114, the controller 108, and/or other elements of the machine 100 can permit the operator to begin controlling the machine 100 to drive the machine 100 and/or perform work operations with the machine 100 based on the operator-confirmed control scheme.

For example, after the operator confirms the current control scheme of the machine 100 via the control scheme confirmation screen 116, the user interface manager 114 may cause the display 112 to present other screens, views, and/or other user interface elements associated with active operations of the machine 100. For instance, the user interface manager 114 can cause the display 112 to transition from presenting the control scheme confirmation screen 116 to presenting information such as machine speed values, hydraulic pressure values, battery charge level values, fuel tank levels, temperature values, maps and/or other navigation information, machine control options, implement control options, images captured by cameras of the machine 100, and/or any other information that may reflect the status of the machine 100 and/or that can be used by the operator while the machine 100 is in active operation.

The user interface manager 114 may be configured to present the control scheme confirmation screen 116 via the display 112 upon the occurrence of one or more trigger conditions, such as machine-on events, implement change events, operator change events, and/or other events or conditions. The user interface manager 114, the controller 108, and/or other elements of the machine 100 may be configured to prevent the operator from actively operating the machine 100 following such trigger conditions until the operator provides user input, via the control scheme confirmation screen 116, to confirm that the operator is aware of the current control scheme. Accordingly, the operator can learn and/or adjust the current control scheme, and confirm that the operator knows the current control scheme, via the control scheme confirmation screen 116 before the operator begins driving the machine 100 or performing work operations with the machine 100 and/or implements 102.

As a first example of a trigger condition for displaying the control scheme confirmation screen 116, the user interface manager 114 may be configured to present the control scheme confirmation screen 116 via the display 112 in association with a machine-on event when the machine 100 is initially turned on. When the machine 100 is turned on, the display 112 can activate and the user interface manager 114 can present user interface elements via the display 112. The user interface manager 114 may cause the display 112 to present one or more initial views or screens, such as an operator login screen that allows the operator who will be operating the machine 100 to enter an operator identification number or other login information that identifies the operator. User entry of login information that identifies the operator may allow the user interface manager 114 to identify corresponding operator profile information that stores preferences or settings associated with the operator, such as language preferences or other settings. Accordingly, the user interface manager 114 may cause the display 112 to present user interface elements in a language that has been previously selected by the operator and/or otherwise present user interface elements based on settings previously selected by the operator.

After displaying an operator login screen and/or other initial screens or views when the machine 100 is initially turned on, the user interface manager 114 can cause the display 112 to display the control scheme confirmation screen 116 as described herein. Accordingly, the operator who will be operating the machine 100 can use the control scheme confirmation screen 116 to learn the current control scheme that the machine 100 is configured to use, optionally change the current control scheme, and confirm that the operator is aware of the current control scheme. Once the operator confirms that the operator is aware of the current control scheme via the control scheme confirmation screen 116, the operator can begin active operations of the machine 100 based on the operator-confirmed control scheme, and the user interface manager 114 can cause the display 112 to transition to presenting other screens, views, and/or other user interface elements associated with active operations of the machine 100.

In some examples, one or more elements of the control scheme data 110 can be determined based on an operator profile, such as preferences or settings for control scheme configurations that the corresponding operator has set in the past. Accordingly, based on an operator identifier entered after the machine 100 is turned on, the controller 108 and/or the user interface manager 114 may determine the control scheme data 110 based at least in part on the corresponding operator profile, and display the current control scheme via the control scheme confirmation screen 116.

However, in other examples, some or all of the control scheme data 110 may not be linked to operator profiles of individual operators. For example, the control scheme of the machine 100 may be changed or determined based at least in part on the conditions and/or environment in which the machine 100 is operating, such that it may not be suitable to store or use preset control scheme configurations in association with operator profiles for individual operators. For instance, if the machine 100 is operating in muddy conditions, a previous operator may have changed the control scheme of the machine 100 to account for the muddy conditions. Those changes can be stored in the control scheme data 110 such that they can be used when another operator next uses the machine 100 in the muddy conditions. Accordingly, rather than re-setting the control scheme of the machine 100 based on pre-set preferences of the next operator stored in an operator profile that may not be appropriate for the muddy conditions, the machine 100 can continue to be configured to use the control scheme that was set by the previous operator based on the muddy conditions when the next operator turns on the machine 100. Additionally, when the next operator turns on the machine 100, the current control scheme, previously changed to account for the muddy conditions, can be displayed to the next operator via the control scheme confirmation screen 116. The next operator can review the control scheme confirmation screen 116 to learn the current control scheme that may have been changed by a previous operator, for instance learn which machine controls 106 may have been adjusted to account for the muddy conditions. The next operator may optionally make any desired changes to the control scheme via the control scheme confirmation screen 116, and can confirm the control scheme via the control scheme confirmation screen 116 before the operator begins actively using the machine 100.

As a second example of a trigger condition for displaying the control scheme confirmation screen 116, the user interface manager 114 may be configured to present the control scheme confirmation screen 116 via the display 112 in association with an implement change event. As discussed above, the machine 100 may be configured to change implements 102, for instance by detaching one implement and attaching another implement. When the machine 100 changes implements 102, the implement change can be detected automatically and/or based on user input.

As an example, the machine 100 may have an implement detector 118 that is configured to automatically detect when new implements 102 are attached to the machine 100 and/or to determine the types or models of the new implements 102. The implement detector 118 can be executed by, or linked to, the controller 108 or another on-board computing system of the machine 100. The implement detector 118 may detect new implements attached to the machine 100 based on wired or wireless data connections between the implements 102 and the controller 108 or other computing systems of the machine 100, based on radio frequency identification (RFID) tags of the implements 102, based on barcodes, QR codes, or other codes displayed on the implements 102 that are recognized by cameras or scanners of the machine 100, based on types of physical connectors or other physical attributes of the implements 102, and/or via other implement-detection systems of the machine 100.

As another example, operators can use the display 112 or other input devices to manually indicate when a new implement is attached to the machine 100, and to indicate the type or model of the new implement. For instance, when an operator attaches a new implement to the machine 100, the operator may use one or more options or menus presented via the display 112 to provide user input identifying than the implement has been changed and/or that identifies the type or model of the newly-attached implement.

When an implement change event occurs and a newly-attached implement is detected automatically and/or based on user input, the controller 108 and/or the user interface manager 114 may use stored control scheme data 110 to determine default control scheme data 110 or the latest operator-set control scheme data 110 associated with the newly-attached implement. The user interface manager 114 can also, in response to the implement change event, cause the display 112 to display the control scheme confirmation screen 116 as described herein. Accordingly, the operator who will be operating the machine 100 in association with the newly-attached implement can use the control scheme confirmation screen 116 to learn the current control scheme that the machine 100 is configured to use in association with the newly-attached implement. The operator may also use the control scheme confirmation screen 116 to optionally change the control scheme associated with the newly-attached implement, and confirm that the operator is aware of the current control scheme associated with the newly-attached implement. Once the operator confirms that the operator is aware of the current control scheme associated with the newly-attached implement via the control scheme confirmation screen 116, the operator can actively operate the machine 100 and the newly-attached implement based on the operator-confirmed control scheme, and the user interface manager 114 can cause the display 112 to transition to presenting other screens, views, and/or other user interface elements associated with active operations of the machine 100.

In some examples, an implement change event can occur while the machine 100 is turned off. Accordingly, the control scheme confirmation screen 116 can be displayed in response to both a machine-on event and an implement change event. For example, if a new implement is attached to the machine 100 while the machine 100 is turned off, the new implement may be detected when the machine 100 is next turned on. The current control scheme associated with both the new implement and the machine 100 overall can be presented to an operator via the control scheme confirmation screen 116 as part of a machine startup process when the machine 100 is turned on, such that the operator can learn, optionally change, and confirm the control scheme for the machine 100 and the new implement before beginning active operations of the machine 100.

In other examples, an implement change event can occur while the machine 100 is already on and in active use. An operator may have confirmed a control scheme via the control scheme confirmation screen 116 when the machine 100 was initially turned on and a first implement was attached to the machine 100. However, the operator may have later chosen to disconnect the first implement from the machine 100 and to attach a new second implement to the machine 100 while the machine is still turned on. In this situation, when the new implement is attached and detected automatically or via manual user input, the user interface manager 114 can present the control scheme confirmation screen 116 that displays the current control scheme associated with the new implement and allows the operator to optionally change the control scheme associated with the new implement. The user interface manager 114 and/or controller 108 may be configured to disallow active usage of the machine 100 and/or the new implement following the attachment of the new implement, until the operator confirms the control scheme associated with the new implement via the control scheme confirmation screen 116. For example, although the machine 100 may remain turned on, the machine 100 may idle and/or transition to a low-power state in which the machine 100 cannot be driven or used to perform work operations until the operator confirms the control scheme associated with the new implement via the control scheme confirmation screen 116.

As a third example of a trigger condition for displaying the control scheme confirmation screen 116, the user interface manager 114 may be configured to present the control scheme confirmation screen 116 via the display 112 in association with an operator change event. In some situations, a new operator may take over operation of the machine 100 from a previous operation while the machine 100 is turned off. For instance, the previous operator may finish a shift and turn off the machine 100, and the next operator may subsequently begin a shift and turn on the machine 100 again such that the control scheme confirmation screen 116 can be presented in association with a machine-on event. However, in other situations, a previous operator may park the machine 100 but keep the machine 100 idling while turned on so that another operator can begin operating the machine 100 without restarting the machine 100. In this example, the new operator may use a login screen on the display 112 to manually enter a new operator identifier or other login operation that identifies the new operator, or the machine 100 may automatically detect that the operator of the machine 100 has changed based on an RFID tag carried by the new operator, based on cameras in the cab of the machine 100, based on a scheduled shift change, or through another operator detection system.

Accordingly, when a new operator of the machine 100 is detected without the machine 100 having been shut down and restarted, the user interface manager 114 can present the control scheme confirmation screen 116 that displays the current control scheme of the machine 100 to the new operator and allows the new operator to optionally change the control scheme of the machine 100. The user interface manager 114 and/or controller 108 may be configured to disallow active usage of the machine 100 by the new operator, until the new operator confirms the control scheme associated with the machine 100 via the control scheme confirmation screen 116. For example, although the machine 100 may idle but remain turned on during an operator change, the machine 100 may continue to idle and be in a state in which the machine 100 cannot be driven or used to perform work operations until the new operator confirms the control scheme associated with the machine 100 via the control scheme confirmation screen 116.

In some examples, the user interface manager 114 may cause multiple control scheme confirmation screens 116 to be displayed in sequence, before the machine 100 can be actively used. Different control scheme confirmation screens 116 can be associated with different types of machine controls 106, and/or different types of operations or functions of the machine 100 or implements 102.

As an example, in response to a machine-on event, the user interface manager 114 may be configured to display a first control scheme confirmation screen 116 that presents a current control scheme associated with the transmission 104 of the machine 100, such that an operator can learn the control scheme associated with the transmission 104, operationally change the control scheme associated with the transmission 104, and confirm that the operator is aware of the control scheme associated with the transmission 104. After the operator has used the first control scheme confirmation screen 116 to confirm that the operator is aware of the control scheme associated with the transmission 104, the user interface manager 114 may be configured to display a second control scheme confirmation screen 116 that presents a current control scheme associated with an implement that is attached to the machine 100. Accordingly, the operator can use the second control scheme confirmation screen 116 to learn the control scheme associated with the implement, operationally change the control scheme associated with the implement, and confirm that the operator is aware of the control scheme associated with the implement.

Figure 2:
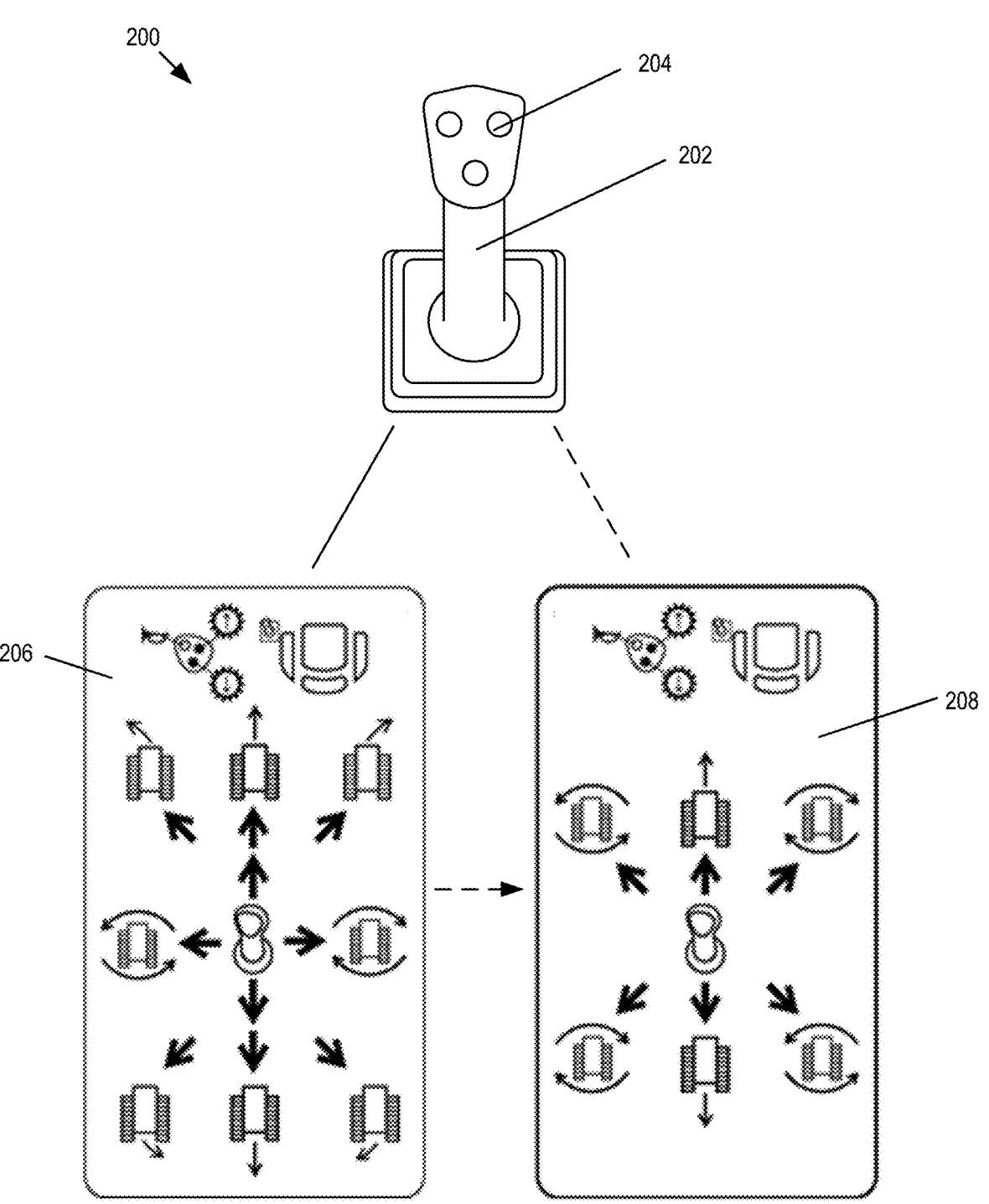
FIG. 2 shows an example in which different control schemes can be used in association with a joystick of the machine.

Overall, because control schemes associated with machine controls 106 can be changed, the control scheme confirmation screen 116 can present information about a current control scheme to an operator in response to trigger conditions, such that the operator can confirm awareness of the current control scheme before beginning active operations of the machine 100 via the machine controls 106. FIG. 2, discussed further below, shows an example in which different control schemes can be used with the same machine controls 106.

FIG. 2 shows an example 200 in which different control schemes can be used in association with a joystick 202 of the machine 100. As discussed above, the machine may have one or more types of machine controls 106. The machine controls 106 can, in some examples, include the joystick 202 shown in FIG. 2. The joystick 202 can also have one or more buttons 204 that may be used to cause operations of the machine 100 and/or one or more implements 102 attached to the machine 100.

As discussed above, the controller 108 of the machine 100 can use control scheme data 110 to translate operator input provided via machine controls 106, such as the joystick 202 and buttons 204 of the joystick 202, to cause corresponding movements and operations of the machine 100 or implements 102. Although the machine controls 106 can physically remain the same, the control scheme data 110 can be changed to adjust which movements and operations of the machine 100 or implements 102 are caused by operator input provided via machine controls 106. As described herein, the control scheme confirmation screen 116 can display the current control scheme associated with the machine controls 106 to an operator, such that the operator can learn the current control scheme, optionally change the control scheme, and confirm that the operator is aware of the current control scheme before the operator begins actively operating the machine 100.

As shown in FIG. 2, the control scheme data 110 may indicate that the joystick 202 is set to control movement of the machine 100 according to either a first control scheme 206 or a second control scheme 208. The first control scheme 206 may control steering of the machine 100 such that angling the joystick 202 forward and to the right causes the machine 100 to move forward while also turning to the right. The second control scheme 208 may control steering of the machine 100 via the joystick 202 differently than the first control scheme 206, for instance such that angling the joystick 202 forward and to the right causes the machine 100 to spin around a fixed point without moving forward.

The control scheme confirmation screen 116 can be presented to an operator of the machine 100 in response to a machine-on event, an implement change event, an operator change event, or another trigger condition. For example, in response to a machine-on event when the machine 100 is turned on, the control scheme confirmation screen 116 can be presented to an operator via the display 112. If the control scheme data 110 indicates that the machine 100 is currently configured according to the first control scheme 206 when the machine-on event occurs, the control scheme confirmation screen 116 can display a visual representation of the first control scheme 206 to the operator. The visual representation of the first control scheme 206 presented via the control scheme confirmation screen 116 may be similar to the visual representation of the first control scheme 206 shown in FIG. 2. Accordingly, the operator can review the control scheme confirmation screen 116 to learn how different movements of the joystick 202 will be translated into movements of the machine 100, and to learn what operations would be caused by activation of the buttons 204 on the joystick 202. If the operator wants to use the first control scheme 206, the operator may confirm that the operator is aware that the first control scheme 206 will be used via the control scheme confirmation screen 116.

However, if the operator would instead prefer to use the second control scheme 208 to control the machine 100, the operator can use the control scheme confirmation screen 116 to change settings and the underlying control scheme data 110 such that the machine 100 becomes configured to use the second control scheme 208. A visual representation of the newly-selected second control scheme 208 can also be displayed via the control scheme confirmation screen 116, such as a visual representation similar to the visual representation of the second control scheme 208 shown in FIG. 2. The operator can use the control scheme confirmation screen 116 to confirm that the operator is aware that the second control scheme 208 will be used to control the machine 100. Examples of instances of the control scheme confirmation screen 116 are shown in FIG. 3, and are discussed further below with respect to that figure.

FIG. 3 shows an example 300 of a sequence of control scheme confirmation screens 116 that may be presented via the display 112. For example, in response to a machine-on event, the display 112 may present a first control scheme confirmation screen 302 associated with first machine controls 106 that operate the transmission 104, brakes, and/or other elements of the machine 100 associated with driving the machine 100. The first control scheme confirmation screen 302 can display visual depictions of the first machine controls 106, along with corresponding text, icons, and/or other elements indicating how, based on the current control scheme data 110, types of input provided by the first machine controls 106 are currently configured to be translated into driving operations, transmission functions, brake functions, and/or other operations of the machine 100.

The first control scheme confirmation screen 302 can also present a user-selectable customization option 304, such as a button or other icon. If an operator selects the customization option 304, the display 112 may present other options, menus, and/or views that allow the operator to change and customize which operations will result from operator input provided via the first machine controls 106. The customized changes can be stored as updated control scheme data 110, and visual representations of the updated control scheme can be displayed via the first control scheme confirmation screen 302.

The first control scheme confirmation screen 302 can also present a user-selectable control scheme confirmation option 306. When the display 112 presents the first control scheme confirmation screen 302, an operator can review the first control scheme confirmation screen 302 to learn the current control scheme associated with the transmission 104 and/or other driving operations of the machine 100. In some examples, the operator can optionally make changes to the control scheme via the customization option 304. Once the operator has learned and/or customized the control scheme based on the first control scheme confirmation screen 302, the operator can select the control scheme confirmation option 306 to confirm that the operator is aware that the machine 100 is currently configured to use the control scheme represented via the first control scheme confirmation screen 302 to control the transmission 104 and/or other operations associated with driving the machine 100.

In response to selection of the control scheme confirmation option 306 on the first control scheme confirmation screen 302, the display 112 can transition to presenting a second control scheme confirmation screen 308 that is associated with second machine controls 106 that control movements and/or other operations of an implement integrated into and/or attached to the machine 100. For example, the second control scheme confirmation screen 308 may display control scheme information associated with a bucket attached to the machine 100, and indicate that movements of the bucket can be controlled by either or both of a switch and a lever. The second control scheme confirmation screen 308 can display visual depictions of the second machine controls 106, along with corresponding text, icons, and/or other elements indicating how, based on the current control scheme data 110, types of input provided by the second machine controls 106 are currently configured to be translated into movements of the implement.

The second control scheme confirmation screen 308 can also present instances of the customization option 304 and the control scheme confirmation option 306. Accordingly, an operator may optionally select the customization option 304 on the second control scheme confirmation screen 308 to customize how the second machine controls 106 are used to control the implement. Any changes to the control scheme made via the customization option 304 may be visually indicated via the second control scheme confirmation screen 308. Once the operator has used the second control scheme confirmation screen 308 to learn and/or customize the control scheme associated with the implement based on the second control scheme confirmation screen 308, the operator can select the control scheme confirmation option 306 on the second control scheme confirmation screen 308 to confirm that the operator is aware that the machine 100 is currently configured to use the control scheme represented via the second control scheme confirmation screen 308 to control operations of the implement.

In response to selection of the control scheme confirmation option 306 on the second control scheme confirmation screen 308, the display 112 can transition to presenting an operations screen 310. The operations screen 310 can present information associated with active operations of the machine 100. For example, the operations screen 310 can present information such as machine speed values, hydraulic pressure values, battery charge level values, fuel tank levels, temperature values, maps and/or other navigation information, machine control options, implement control options, images captured by cameras of the machine 100, and/or any other information that may reflect the status of the machine 100 and/or that can be used by the operator while the machine 100 is in active operation. As shown in FIG. 3, the operator may first review the first control scheme confirmation screen 302 and the second control scheme confirmation screen 308 to learn and/or customize control schemes associated with driving operations and implement operations, and to confirm via instances of the control scheme confirmation option 306 that the operator is aware of those control schemes, before the display 112 presents the operations screen 310.

Although two different control scheme confirmation screens 116 are shown in the example 300 of FIG. 3, other and/or different control scheme confirmation screens 116 can be displayed via the display 112. As an example, if the machine 100 has different types of machine controls 106, the display 112 can present different control scheme confirmation screens 116 that display visual representations of the different types of machine controls 106 and the operations that are currently set to occur when the different types of machine controls 106 are used. As another example, if the machine 100 has auxiliary systems, such as lights, air conditioning systems, heating systems, and/or other types of systems, the display 112 may also display one or more control scheme confirmation screens 116 instead of or in addition to the first control scheme confirmation screen 302 and the second control scheme confirmation screen 308 that allow an operator to learn and/or customize a control scheme used to control those auxiliary systems via one or more types of machine controls 106.

Although the customization option 304 is shown as being presented via the first control scheme confirmation screen 302 and the second control scheme confirmation screen 308 in the example 300 of FIG. 3, in some examples the customization option 304 can be omitted from instances of the control scheme confirmation screen 116. In these examples, an operator may learn, and confirm awareness of, the current control scheme via the control scheme confirmation screen 116. After the operator has learned, and confirmed awareness of, the current control scheme and the display 112 transitions to presenting the operations screen 310, the operator may select an options via the operations screen 310 that allow the operator to optionally reconfigure the control scheme.

Overall, the sequence of control scheme confirmation screens 116 shown in FIG. 3 may be presented in order to inform an operator of a control scheme associated with machine controls 106, and to receive confirmation from the operator that the operator is aware of the control scheme, before the operator begins actively using the machine controls 106. An example process by which the sequence of control scheme confirmation screens 116 shown in FIG. 3 can be presented is discussed further below with respect to FIG. 4.

Figure 4:
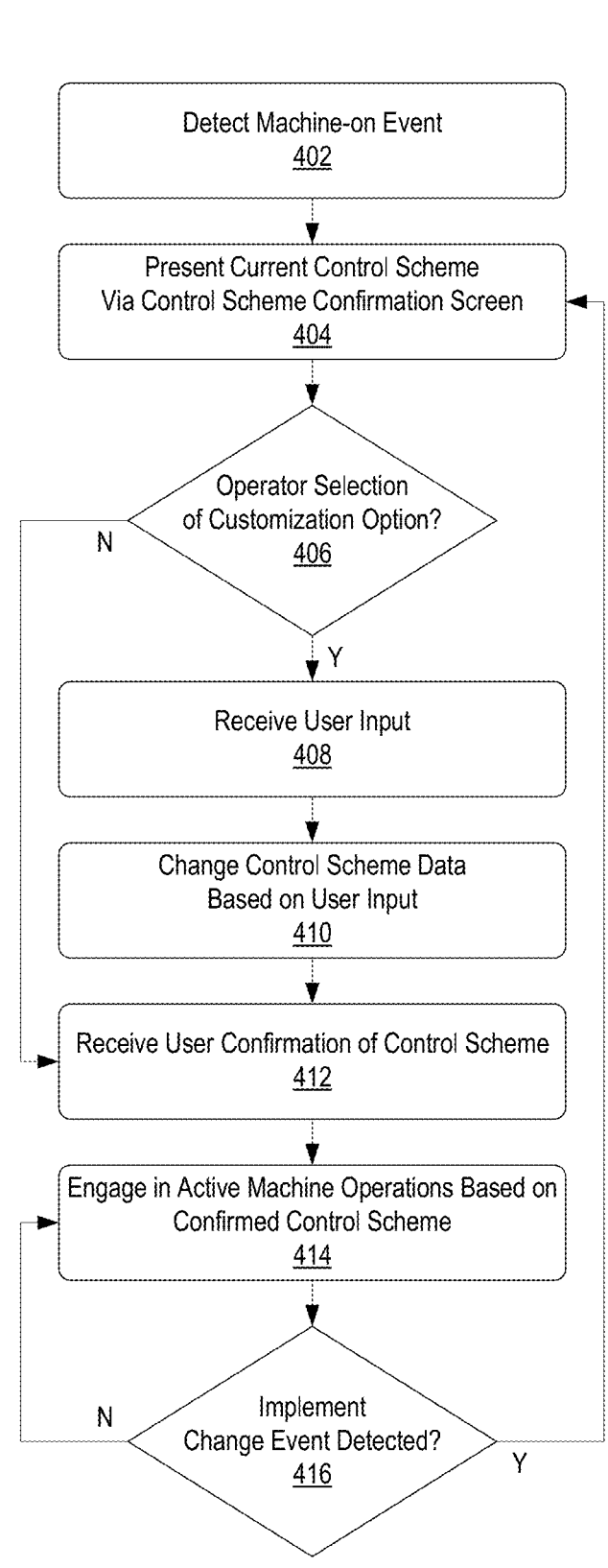
FIG. 4 is a flowchart illustrating an exemplary process for presenting and confirming a control scheme used by the machine before the machine is actively used by an operator.
Figure 5:
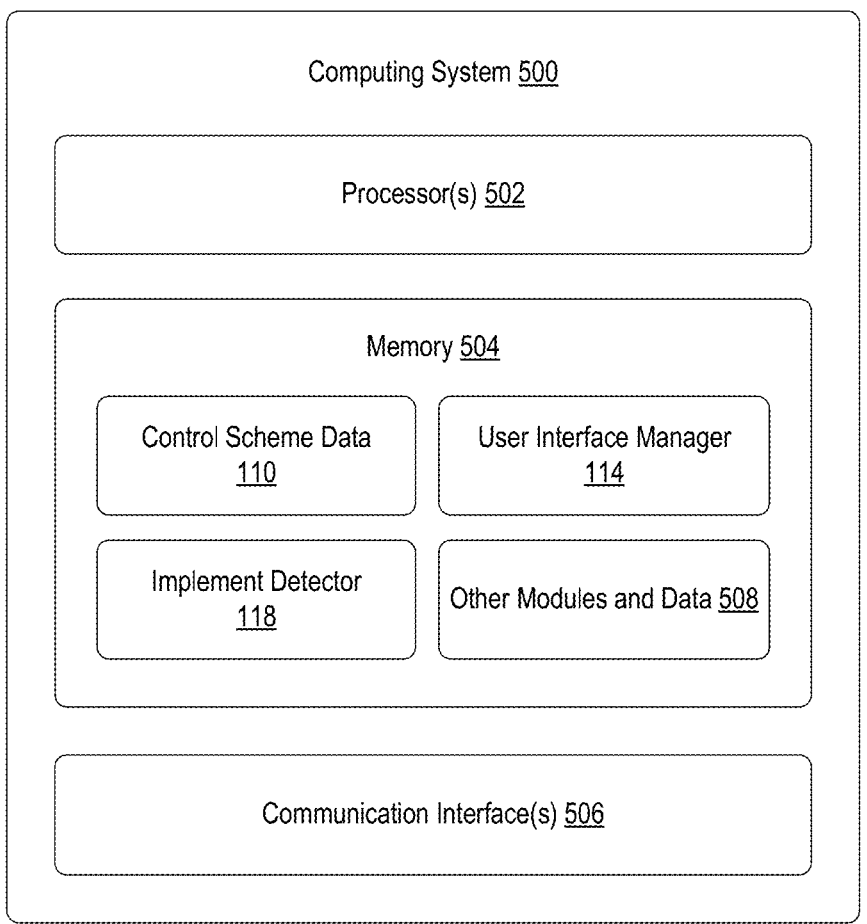
FIG. 5 is a schematic illustration depicting an exemplary architecture of a computing system.

FIG. 4 is a flowchart 400 illustrating an exemplary process for presenting and confirming a control scheme used by the machine 100 before the machine 100 is actively used by an operator. The operations shown in FIG. 4 can be performed by one or more on-board computing systems of the machine 100, such as the controller 108 or other computing systems. FIG. 5, discussed further below, describes an example system architecture for such an on-board computing system.

At block 402, the computing system can detect a machine-on event. For example, when the machine 100 is turned on after being in an off state, a machine-on event can occur and initiate a startup procedure. For example, the computing system on-board the machine 100 can activate, the user interface manager 114 can begin displaying information via the display 112, and/or other startup operations can begin to prepare the machine 100 to be actively used. In some examples, the user interface manager 114 can cause one or more initial screens to be presented via the display 112, such as an operator login screen that an operator can use to provide an operator identifier or other login credentials.

The computing system can be configured to prevent the operator from actively operating the machine 100 until the operator provides user confirmation input confirming that the operator is aware of the control scheme that will be used to control the machine 100 via machine controls 106. Accordingly, in response to the machine-on event detected at block 402, the user interface manager 114 can avoid presenting the operations screen 310 and can instead present information associated with the current scheme via the control scheme confirmation screen 116 at block 404. For example, the control scheme confirmation screen 116 displayed at block 404 can present visual representations of machine controls 106 and corresponding operations that, based on the current control scheme data 110, would result from usage of the machine controls 106.

In some examples, the current control scheme data 110 may be determined based at least in part on which implements 102 were attached to the machine 100 at the time of the machine-on event. For instance, as part of the machine-on event and/or subsequent startup sequence, the implement detector 118 can determine an identifier of an implement attached to the machine 100. The computing system can determine default or most recent control scheme data 110 associated with that implement, based on the identifier of the implement, such that the control scheme confirmation screen 116 displayed at block 404 can reflect the current control scheme associated with the implement.

At block 406, the computing system can determine whether the operator has selected the customization option 304 via the control scheme confirmation screen 116. Selection of the customization option 304 can indicate that the operator wants to change the control scheme that had been represented on the control scheme confirmation screen 116 presented at block 404.

Accordingly, if the operator selects the customization option 304 (block 406—Yes), the computing system can receive user input associated with operator-requested changes to the control scheme at block 408. For example, in response to selection of the customization option 304, the user interface manager 114 may cause the display 112 to present menus, options, and/or other elements that allow the operator to select from other predetermined control schemes and/or to customize operations that are to result from usage of individual machine controls 106 or functions or elements of the machine controls 106. At block 410, the computing system can use the user input received at block 408 to make corresponding changes to the control scheme data 110 that will be used by the controller 108 to translate input received via the machine controls 106 into corresponding movements and/or operations of the machine 100 and/or one or more implements 102.

After changing the control scheme data at block 410, or if the operator did not select the customization option 304 (block 406—No), at block 412 the computing system can receive user confirmation input confirming of the control scheme that was initially presented at block 404 and/or was changed at blocks 408 and 410. For example, the computing system can determine when the operator selects the control scheme confirmation option 306 on the control scheme confirmation screen 116 to confirm that the operator is aware of the control scheme that is currently set to be used to control the machine 100. In some examples, blocks 404 through 412 may be repeated for different types of machine controls 106, different operations and/or systems of the machine 100, and/or different operations of one or more implements 102, such that the operator can learn, optionally adjust, and confirm awareness of the corresponding control schemes.

In response to receiving user confirmation input confirming the operator's awareness of the control scheme that is set to be used to control the machine 100 at block 412, the computing system can enable the machine 100 to engage in active machine operations based on the confirmed control scheme at block 414. For example, the controller 108 can begin using the confirmed control scheme, via the control scheme data 110, to translate operator input provided by the machine controls 106 into corresponding movements and other operations of the machine 100 and/or one or more implements 102. The user interface manager 114 can also cause the display 112 to transition to presenting the operations screen 310, such that the operator can review information presented on the operations screen 310 while driving the machine 100 and/or using one or more implements 102 to perform work tasks.

At block 416, the computing system can determine whether an implement change event is detected. In some examples, the machine 100 can have an implement detector 118 configured to automatically detect when a new implement is attached to the machine 100, and can thereby automatically detect an implement change event. In other examples, an implement change event can be detected based on user input provided by the operator indicating that a new implement has been attached to the machine 100.

If an implement change event is not detected (Block 416—No), the computing system can continue to permit the machine 100 to engage in active machine operations based on the confirmed control scheme at block 414. However, if an implement change event is detected (Block 416—Yes), the computing system can disallow and/or disable active machine operations and return to block 404 to present a new instance of the control scheme confirmation screen 116 in response to the implement change event. For example, based on an identification of a newly-attached implement, the computing system and/or the user interface manager 114 may use stored control scheme data 110 to determine default control scheme data 110 or the latest operator-set control scheme data 110 associated with the newly-attached implement. The computing system and/or the user interface manager 114 can use such control scheme data 110 to display representations of the corresponding control scheme for the newly-attached implement via the new instance of the control scheme confirmation screen 116 displayed at block 404. The operator can accordingly learn the control scheme associated with the newly-attached implement via the new instance of the control scheme confirmation screen 116, optionally make changes to that control scheme, and confirm awareness of the control scheme associated with the newly-attached implement. When the operator confirms awareness of the control scheme associated with the newly-attached implement via the new instance of the control scheme confirmation screen 116, the computing device can enable the machine 100 to engage in active machine operations, including operations associated with the newly-attached implement, based on the confirmed control scheme.

FIG. 5 is a schematic illustration depicting an exemplary architecture of a computing system 500 that executes one or more elements described in the present disclosure. The computing system 500 can include one or more processors 502, memory 504, and communication interfaces 506. The computing system 500 can be, or include, the controller 108 and/or one or more other on-board computing devices of the machine 100.

The processor(s) 502 can operate to perform a variety of functions as set forth herein. The processor(s) 502 can include one or more chips, microprocessors, application specific integrated circuits (ASICs), field programmable gate arrays (FPGAs) and/or other programmable circuits, central processing units (CPUs), graphics processing units (GPUs), digital signal processors (DSPs), and/or other processing units or components known in the art. In some examples, the processor(s) 502 can have one or more arithmetic logic units (ALUs) that perform arithmetic and logical operations, and/or one or more control units (CUs) that extract instructions and stored content from processor cache memory, and executes such instructions by calling on the ALUs during program execution. The processor(s) 502 can also access content and computer-executable instructions stored in the memory 504, and execute such computer-executable instructions.

The memory 504 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media can be non-transitory computer-readable media. The computer-readable media can be configured to store computer-executable instructions that can be executed by the processor(s) 502 to perform operations described herein.

For example, the memory 504 can include a drive unit and/or other elements that include machine-readable media. A machine-readable medium can store one or more sets of instructions, such as software or firmware, that embodies any one or more of the methodologies or functions described herein. The instructions can also reside, completely or at least partially, within the processor(s) 502 and/or communication interface(s) 506 during execution thereof by the computing system 500. For example, the processor(s) 502 can possess local memory, which also can store program modules, program data, and/or one or more operating systems.

The memory 504 can store data and/or computer-executable instructions associated with the control scheme data 110, the user interface manager 114, and/or the implement detector 118. For example, the memory 504 can store data and/or computer-executable instructions that cause the computing system 500 to translate input data received via machine controls 106 into commands or signals that cause corresponding operations determined based on the control scheme data 110. The memory 504 can also store other modules and data 508 that can be utilized by the computing system 500 to perform or enable performing any action taken by the computing system 500. For example, the other modules and data 508 can include a platform, operating system, and/or applications, as well as data utilized by the platform, operating system, and/or applications.

The communication interfaces 506 can include interfaces by which the computing system 500 can receive input data from the machine controls 106, the display 112, and/or other devices or systems. The communication interfaces 506 can also include interfaces by which the computing system 500 can output data, such as commands or signals translated from input data based on the control scheme data 110, user interface elements and other data to be presented via the display 112, and/or other types of output data. In some examples, the communication interfaces 506 can include transceivers, modems, interfaces, antennas, and/or other components that can transmit and/or receive data over networks, wireless connections, wired connections, or other data connections.

INDUSTRIAL APPLICABILITY

As described above, the control scheme confirmation screen 116 can be presented via the display 112 of the machine 100 such that an operator of the machine 100 can learn the current control scheme that the machine 100 is configured to use, optionally change the control scheme, and confirm that the operator is aware of the control scheme that the machine 100 is configured to use. The control scheme confirmation screen 116 can be presented in response to a machine-on event, an implement change event, an operator change event, or another trigger condition. The machine 100 can disallow active operations of the machine 100 following the occurrence of such a trigger condition, until an operator provides user input via the control scheme confirmation screen 116 to confirm that the operator is aware of the control scheme that the machine 100 is configured to use. Presentation of the control scheme confirmation screen 116 and corresponding receipt of confirmation that the operator is aware of the control scheme that will be used to control operations of the machine 100 prior to active use can improve efficiency and improve safety associated with operations of the machine 100.

For example, efficiency and safety associated with the machine 100 and the environment around the machine 100 can be improved by presenting the current control scheme to an operator via the control scheme confirmation screen 116 before the operator begins actively using the machine 100 to perform work tasks. Accordingly, the operator can become aware of any non-standard or unexpected aspects of the current control scheme, and/or change any aspects of the control scheme, before beginning active use of the machine 100. The operator can also confirm, via the control scheme confirmation screen 116, that the operator is aware of the current control scheme, thereby ensuring that the operator knows which actions will result from usage of the machine controls 106. By ensuring that the operator knows which actions will result from usage of the machine controls 106, the risk of the operator using the machine 100 in an unexpected and/or unsafe manner due to an unexpected control scheme can be reduced.

The control scheme confirmation screen 116 can also improve efficiency when an operator uses a type of machine the operator has not used before, or uses a machine that has machine controls 106 that the operator has not used before. For example, by presenting visual representations of the current control scheme to the operator via the control scheme confirmation screen 116, the operator can quickly learn which machine controls 106 are present within the machine 100 and which actions will result from usage of those machine controls 106. Accordingly, the operator can learn the control scheme associated with the machine controls 106 via the control scheme confirmation screen 116, which can be more efficient and or less dangerous than the operator attempting to learn the control scheme through trial and error over a period of time.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof.

What is claimed is:

1. A computer-implemented method, comprising:

detecting, by a processor of an on-board computing system of a machine, an occurrence of a trigger event comprising at least one of:

a machine-on event associated with the machine being turned on, an implement change event associated with a new implement being attached to the machine, or an operator change event associated with a new operator taking control of the machine;

preventing, by the processor in response to the occurrence of the trigger event, first operations of a transmission of the machine and second operations of an implement of the machine until a user of the machine confirms a first control scheme and a second control scheme to be respectively used to translate input data from machine controls of the machine into the first operations of the transmission and the second operations of the implement, wherein:

the implement comprises the new implement or a second implement of the machine;

causing, by the processor in response to the occurrence of the trigger event, a display of the machine to present:

a first control scheme confirmation screen that visually depicts the first control scheme that, based on control scheme data, is currently configured to be used to translate the input data from the machine controls of the machine into the first operations of the transmission; and a second control scheme confirmation screen that visually depicts the second control scheme that, based on the control scheme data, is currently configured to be used to translate the input data from the machine controls into the second operations of the implement;

receiving, by the processor via the first control scheme confirmation screen, first user input comprising a first confirmation of the first control scheme;

receiving, by the processor via the second control scheme confirmation screen, second user input comprising a second confirmation of the second control scheme; and enabling, by the processor in response to receipt of the first user input and the second user input, the first operations of the transmission and the second operations of the implement that are respectively controlled via the machine controls using the first control scheme and the second control scheme based on the control scheme data.

2. The computer-implemented method of claim 1, wherein the first operations of the transmission, controlled via the machine controls using the first control scheme based on the control scheme data, comprise driving operations of the machine.

3. The computer-implemented method of claim 1, wherein the second implement was previously attached to the machine.

4. The computer-implemented method of claim 1, wherein:

the trigger event comprises the implement change event, the method further comprises:

determining, by the processor, an identifier of the new implement; and determining, by the processor, the second control scheme associated with the new implement based on the identifier of the new implement, and the second control scheme confirmation screen visually depicts the second control scheme associated with the new implement.

5. The computer-implemented method of claim 1, wherein:

the method further comprises:

receiving, by the processor via at least one of the first control scheme confirmation screen or the second control scheme confirmation screen, third user input indicating a requested change to at least one of the first control scheme or the second control scheme; and changing, by the processor, the control scheme data based on the third user input, and at least one of the first user input or the second user input confirms a respective control scheme based at least in part on the changing of the control scheme data based on the third user input.

6. A machine comprising:

a transmission;

an implement configured to perform at least one work task;

machine controls configured to control:

first operations of the transmission based on a first control scheme defined by control scheme data, and second operations of the implement based on a second control scheme defined by the control scheme data;

a display; and an on-board computing system configured to:

detect an occurrence of a trigger event comprising at least one of:

a machine-on event associated with the machine being turned on, an implement change event associated with the implement being attached to the machine, or an operator change event associated with a new operator taking control of the machine;

prevent, in response to the occurrence of the trigger event, the first operations of the transmission and the second operations of the implement until a user of the machine confirms the first control scheme and the second control scheme;

cause, in response to the occurrence of the trigger event, the display to present:

a first control scheme confirmation screen that visually depicts the first control scheme; and a second control scheme confirmation screen that visually depicts the second control scheme;

receive, via the first control scheme confirmation screen, first user input comprising a first confirmation of the first control scheme;

receive, via the second control scheme confirmation screen, second user input comprising a second confirmation of the second control scheme; and enable, in response to receipt of the first user input and the second user input, the first operations of the transmission and the second operations of the implement that are respectively controlled via the machine controls using the first control scheme and the second control scheme based on the control scheme data.

7. The machine of claim 6, wherein:

the trigger event comprises the implement change event, the on-board computing system is further configured to:

determine an identifier of the implement in association with the implement change event; and determine the second control scheme associated with the implement based on the identifier of the implement, and the second control scheme confirmation screen visually depicts the second control scheme associated with the implement based on detection of the implement change event.

8. The machine of claim 6, wherein:

the user input comprises a first user input, the on-board computing system is further configured to:

receive, via at least one of the first control scheme confirmation screen or the second control scheme confirmation screen, third user input indicating a requested change to at least one of the first control scheme or the second control scheme; and change the control scheme data based on the third user input, and at least one of the first user input or the second user input confirms a respective control scheme based at least in part on changing of the control scheme data based on the third user input.

9. A computing system on-board a machine, the computing system comprising:

a processor; and a memory having stored thereon computer-executable instructions that, when executed by the processor, cause the processor to:

detect an occurrence of a trigger event comprising at least one of:

a machine-on event associated with the machine being turned on, an implement change event associated with a new implement being attached to the machine, or an operator change event associated with a new operator taking control of the machine;

prevent, in response to the occurrence of the trigger event, first operations of a transmission of the machine and second operations of an implement of the machine until a user of the machine confirms a first control scheme and a second control scheme to be respectively used to translate input data from machine controls of the machine into the first operations of the transmission and the second operations of the implement, wherein:

the implement comprises the new implement or a second implement of the machine;

cause, in response to the occurrence of the trigger event, a display of the machine to present:

a first control scheme confirmation screen that visually depicts the first control scheme that, based on control scheme data, is currently configured to be used to translate the input data from the machine controls of the machine into the first operations of the transmission; and a second control scheme confirmation screen that visually depicts the second control scheme that, based on the control scheme data, is currently configured to be used to translate the input data from the machine controls into the second operations of the implement;

receive, via the first control scheme confirmation screen, first user input comprising a first confirmation of the first control scheme;

receive, via the second control scheme confirmation screen, second user input comprising a second confirmation of the second control scheme; and enable, in response to receipt of the first user input and the second user input, the first operations of the transmission and the second operations of the implement that are respectively controlled via the machine controls using the first control scheme and the second control scheme based on the control scheme data.

10. The computing system of claim 9, wherein the first operations of the transmission, controlled via the machine controls using the first control scheme based on the control scheme data, comprise driving operations of the machine.

11. The computing system of claim 9, wherein:

the trigger event comprises the implement change event, the computer-executable instructions further cause the processor to:

determine an identifier of the new implement in association with the implement change event; and determine the second control scheme associated with the new implement based on the identifier of the new implement, and the second control scheme confirmation screen visually depicts the second control scheme associated with the new implement.

12. The computing system of claim 9, wherein:

the computer-executable instructions further cause the processor to:

receive, via at least one of the first control scheme confirmation screen or the second control scheme confirmation screen, third user input indicating a requested change to at least one of the first control scheme or the second control scheme; and change the control scheme data based on the third user input, and at least one of the first user input or the second user input confirms a respective control scheme based at least in part on changing of the control scheme data based on the third user input.

13. The computing system of claim 9, wherein the second implement was previously attached to the machine.

14. The computer-implemented method of claim 1, further comprising causing, by the processor in response to receipt of the first user input and the second user input, the display to transition from presenting the first control scheme confirmation screen or the second control scheme confirmation screen to presenting an operations screen configured to indicate one or more types of information associated with machine operations of the machine.

15. The computer-implemented method of claim 1, wherein at least one of the first control scheme or the second control scheme was selected via user input received prior to the occurrence of the trigger event.

16. The computer-implemented method of claim 15, wherein the user input defined the at least one of the first control scheme or the second control scheme, prior to the occurrence of the trigger event, based on preferences of the user or a second user.

17. The computer-implemented method of claim 15, wherein the user input defined the at least one of the first control scheme or the second control scheme, prior to the occurrence of the trigger event, based on conditions of an environment in which the machine is operating.

18. The computer-implemented method of claim 1, wherein the trigger event comprises the implement change event, and the second control scheme comprises:

a default control scheme associated with the new implement, or a custom control scheme, associated with the new implement, selected via user input received prior to the implement change event.

19. The computer-implemented method of claim 1, wherein preventing the first operations and the second operations comprises causing, by the processor, the machine to operate in a low-power state until the user confirms the first control scheme and the second control scheme.

20. The machine of claim 6, wherein the first operations of the transmission, controlled via the machine controls using the first control scheme based on the control scheme data, comprise driving operations of the machine.

* * * * *